United States Patent
Balliello

(10) Patent No.: US 7,033,429 B2
(45) Date of Patent: Apr. 25, 2006

(54) METHOD OF PRODUCING LOW-DUST PIGMENT COMPOSITIONS

(75) Inventor: Paolo Balliello, Rheinfelden (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 10 days.

(21) Appl. No.: 10/493,278

(22) PCT Filed: Oct. 22, 2002

(86) PCT No.: PCT/EP02/11795

§ 371 (c)(1),
(2), (4) Date: Apr. 20, 2004

(87) PCT Pub. No.: WO03/037991

PCT Pub. Date: Aug. 5, 2003

(65) Prior Publication Data

US 2005/0042189 A1 Feb. 24, 2005

(30) Foreign Application Priority Data

Oct. 31, 2001 (CH) .................................. 1993/01
Apr. 18, 2002 (CH) .................................. 0655/02

(51) Int. Cl.
*C09B 67/06* (2006.01)
*C09B 67/08* (2006.01)

(52) U.S. Cl. ............... 106/499; 106/410; 106/412; 106/413; 106/493; 106/494; 106/495; 106/496; 106/497; 106/498; 106/503; 106/505

(58) Field of Classification Search ............... 106/410, 106/412, 413, 493, 494, 495, 496, 497, 498, 106/499, 503, 505
See application file for complete search history.

(56) References Cited

U.S. PATENT DOCUMENTS

| 2,834,773 | A |   | 5/1958  | Scalera et al. ............... 260/148 |
| 4,188,236 | A |   | 2/1980  | Robertson et al. .......... 106/308 |
| 4,507,126 | A |   | 3/1985  | Baliello ........................ 8/526 |
| 4,726,847 | A | * | 2/1988  | Wanser ........................ 106/411 |
| 5,213,583 | A |   | 5/1993  | Kaspar et al. .................. 8/526 |
| 5,643,672 | A |   | 7/1997  | Marchi et al. .............. 428/402 |
| 6,211,346 | B1 | * | 4/2001 | Linke et al. ................. 534/707 |
| 6,485,558 | B1 |   | 11/2002 | Metz et al. .................. 106/493 |

FOREIGN PATENT DOCUMENTS

JP 1-201369 A * 8/1989

* cited by examiner

*Primary Examiner*—Anthony J. Green
(74) *Attorney, Agent, or Firm*—Joseph C. Suhadolnik

(57) ABSTRACT

The present invention relates to a method of producing a low-dust pigment composition, which comprises suspending a filter cake obtained from preparation of the pigment, or a solid pigment, in water, adding thereto from 0.1 to 6.0% by weight, based On the weight of the pigment composition, of an amphoteric surfactant and, where appropriate, further adjuvants, and then drying the aqueous suspension to form granules, to the pigment composition obtainable according to that method, and to the use thereof in the production of colored plastics or colored polymeric particles.

12 Claims, No Drawings

METHOD OF PRODUCING LOW-DUST PIGMENT COMPOSITIONS

The present invention relates to a method of producing stable, low-dust pigment compositions.

A method of producing low-dust colorant granules that are readily soluble in plastics is known from EP-A-0 488 933, in which method a suspension of the colorant, which contains from 0.1 to 5.0% by weight of a polyglycol, is dried to form granules.

U.S. Pat. No. 2,834,773 discloses a solid composition of a specific water-soluble azo dye that comprises an addition of sequestering compounds, e.g. ethylenediaminetetraacetic acid.

There is a need for a method by which it is possible to obtain dust-free or low-dust pigment compositions that also are readily pourable and resistant to rubbing and that meet current requirements, especially in respect of ecological considerations.

It has now, surprisingly, been found that the method according to the invention substantially satisfies the criteria set out above.

The present invention accordingly relates to a method of producing a low-dust pigment composition that comprises suspending a filter cake obtained from preparation of the pigment, or a solid pigment, in water, adding thereto from 0.1 to 6.0% by weight, based on the weight of the pigment composition, of an amphoteric surfactant and, where appropriate, further adjuvants, and then drying the aqueous suspension to form granules.

The pigments suitable for the method according to the invention are, for example, those described under "pigments" in the Colour Index, 3rd Edition (3rd Revision 1987 including Additions and Amendments to No. 85).

In the method according to the invention, preference is given to organic pigments from the class of the azo, azomethine, indigoid, dioxazine, quinacridone, phthalocyanine, isoindolinone, perylene, perinone, metal complex, alkali blue and diketopyrrolopyrrole pigments.

In the method according to the invention, special preference is given to organic metal complex pigments of the azo, azomethine and phthalocyanine class.

In the method according to the invention, very special preference is given to the organic metal complex pigments of formulae

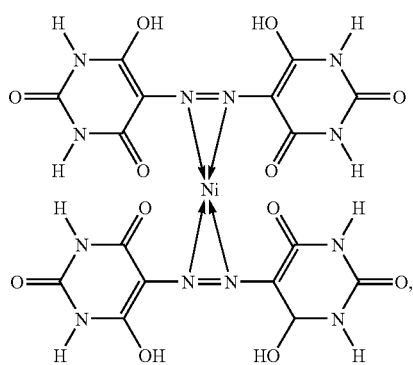

(1)

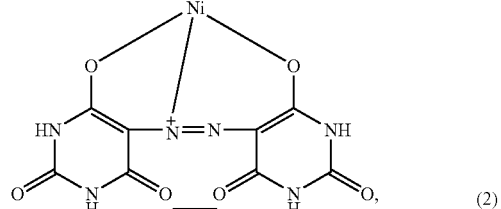

(1a)

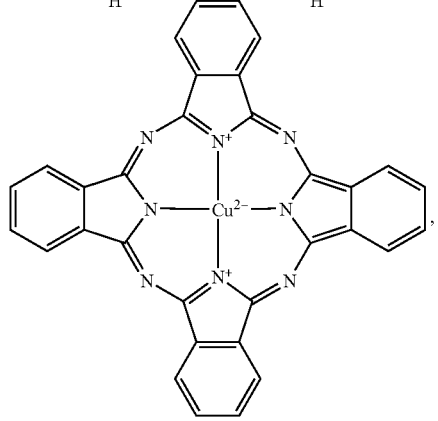

(2)

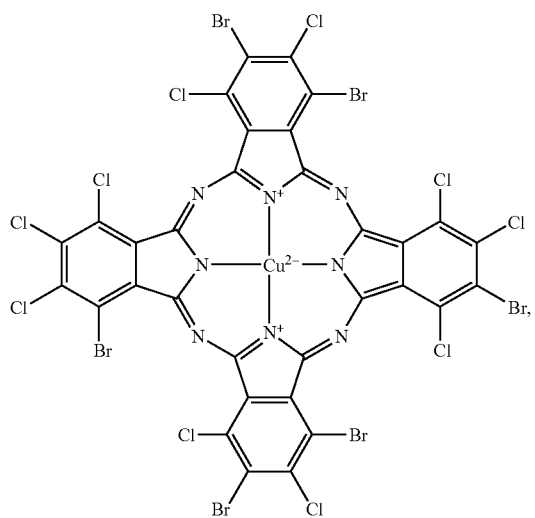

(3)

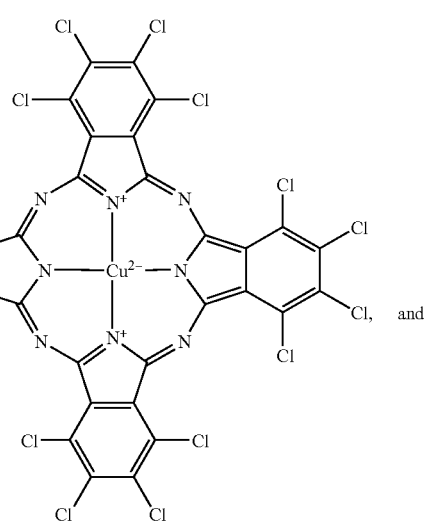

(4)

and

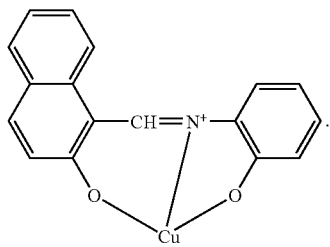
(5)

In the method according to the invention, very special preference is given likewise to organic metal complex pigments, such as the manganese salt of C.I. Pigment Red 48:4, the calcium salt of C.I. Pigment Red 57:1, the barium salt of C.I. Pigment Red 53:1, the chromium complexes of C.I. Solvent Yellow 88, C.I. Solvent Orange 99, C.I. Solvent Brown 42, C.I. Solvent Brown 43, C.I. Solvent Brown 44, C.I. Solvent Red 130, C.I. Solvent Red 233, C.I. Solvent Red 122, C.I. Solvent Red 127, C.I. Solvent Black 28, C.I. Solvent Black 29, and the cobalt complexes of C.I. Solvent Yellow 89, C.I. Solvent Yellow 25, C.I. Solvent Orange 11 and C.I. Solvent Red 125.

The metal complex pigments of formulae (1) to (5) are known and can be prepared according to methods known per se.

The amphoteric surfactants used in the method according to the invention are to be understood, for example, as organic compounds that contain a radical of formula

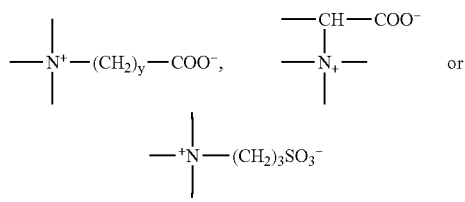

in their molecule and are termed ampholytes, betaines or sulfobetaines.

Among such compounds there may be mentioned, for example, diethylene-triamino-penta-acetic acid, nitrilo-tri-acetic acid, N-hydroxyethyl-diamino-triacetic acid, 1,3-diamino-2-propanol-tetraacetic acid, in free acid form or in the form of, preferably, their sodium salts, and also the compounds of formulae $(CH_3)_3N^+CH_2COO^-$ or $(NaOOC-CH_3)_2N[(CHCH_3)COONa]$.

Special preference is given to the compound of formula

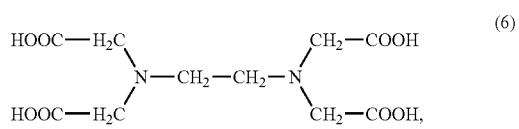
(6)

which is used in free acid form or, preferably, in the form of a salt. Salts of the compound of formula (6) that come into consideration are especially the tetrasodium and calcium-disodium salt.

Special preference is given likewise to the compound of formula

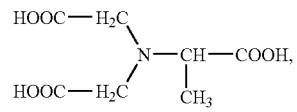
(7)

which is used in free acid form or, preferably, in the form of a salt. A salt of the compound of formula (7) that comes into consideration is especially the trisodium salt.

In the method according to the invention, preference is given to the use of from 0.3 to 4.0% by weight, especially from 0.5 to 3.5% by weight, of an amphoteric surfactant based on the weight of the pigment composition.

The granulation of the aqueous suspension comprising a pigment and from 0.1 to 6.0% by weight, based on the weight of the pigment composition, of an amphotetic surfactant, and also, where appropriate, further adjuvants, is carried out preferably with spray-drying or fluidised-bed granulation.

In a preferred embodiment, the aqueous suspension comprising a pigment and from 0.1 to 6.0% by weight, based on the weight of the pigment composition, of an amphoteric surfactant, is homogenised, for example in a rotor/stator mill and/or bead mill, to form a dispersion having a particle size of from 1 to 100 µm. The resulting dispersion is then spray-dried in a spray-dryer, preferably a pressurised nozzle tower, to form microgranules.

The present invention relates also to a pigment composition comprising at least one pigment and from 0.1 to 6.0% by weight, based on the weight of the pigment composition, of an amphoteric surfactant, and also, where appropriate, further adjuvants. Preferably, the pigment composition according to the invention contains from 94.0 to 99.9% by weight of a pigment and from 0.1 to 6.0% by weight of an amphoteric surfactant, based on the weight of the pigment composition.

With respect to the pigments and amphoteric surfactants present in the pigment compositions according to the invention, the definitions and preferred meanings mentioned hereinabove for the method of producing a low-dust pigment composition apply.

The pigment compositions according to the invention are used preferably for coloring polymeric particles or thermoplastic plastics, especially in the form of fibres, granules or mouldings.

Preferred polymeric particles or thermoplastic plastics that can be colored in accordance with the invention are, as high molecular weight organic materials, very generally polymers having a dielectric constant $\geq 2.5$, especially polyester, polycarbonate (PC), polystyrene (PS), poly-methyl methacrylate (PMMA), polyamide, polyethylene, polypropylene, styrene/acrylonitrile (SAN) or acrylonitrile/butadiene/styrene (ABS).

Polyester, PC and ABS are especially preferred. More especially preferred are linear aromatic polyesters, which can be obtained by polycondensation of terephthalic acid or naphthalene-2,6-dicarboxylic acid and glycols, especially ethylene glycol, or condensation products of terephthalic acid and 1,4-bis(hydroxymethyl)cyclohexane, for example polyethylene terephthalate (PET), polyethylenenaphthalene-2,6-dicarboxylate (PEN) or polybutylene terephthalate (PBTP); also polycarbonates, e.g. those from α,α-dimethyl-4,4-dihydroxy-diphenylmethane and phosgene, or polymers based on polyvinyl chloride and also on polyamide, for example polyamide 6 or polyamide 6,6.

The coloring of the high molecular weight organic materials using pigment compositions according to the invention is carried out, for example, by using rolling mills, mixing apparatus or grinding apparatus to admix such a pigment composition with the substrates, the pigment composition being finely distributed or, where possible, dissolved in the high molecular weight material. The high molecular weight organic material with the admixed pigment composition is then processed according to methods known per se, such as, for example, calendering, compression moulding, extrusion, coating, spinning, pouring or injection moulding, as a result of which the colored material acquires its final shape. Admixture of the pigment composition according to the invention can also be effected directly before the actual processing step, for example by continuously metering, directly into the inlet zone of an extruder, the pigment composition and a granulated or pulverulent high molecular weight organic material and, where appropriate, also other ingredients, such as additives, the constituents being mixed in just before being processed. Generally, however, preference is given to mixing the pigment composition according to the invention into the high molecular weight organic material beforehand, since more uniformly colored substrates can be obtained.

In order to produce non-rigid mouldings or to reduce brittleness, it is frequently desirable to incorporate so-called plasticisers into the high molecular weight compounds prior to shaping. There may be used as plasticisers, for example, esters of phosphoric acid, phthalic acid or sebacic acid. In the method according to the invention, the plasticisers can be incorporated into the polymers before or after the incorporation of the colorant. It is furthermore possible, where appropriate, also to add further ingredients, e.g. fillers or siccatives.

In order to improve light fastness properties, UV absorbers are advantageously admixed with the plastics or polymeric particles to be colored by the compositions according to the invention.

The present invention relates also to the above-mentioned use of the composition according to the invention.

The following Examples serve to illustrate the invention. Unless specified otherwise, the parts are parts by weight and the percentages are percentages by weight. The temperatures are given in degrees Celsius. The relationship between parts by weight and parts by volume is the same as between grams and cubic centimetres.

EXAMPLE 1

In an apparatus equipped with a stirrer, 200.0 parts by weight of an aqueous colorant filter cake containing 97.5 parts by weight of the metal complex pigment of formula

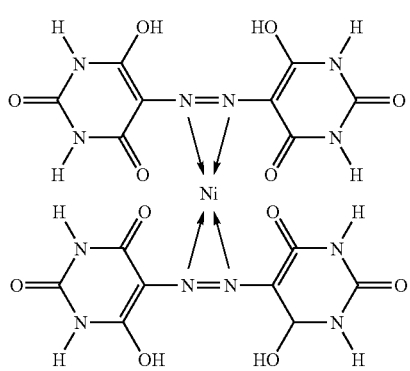

(1)

are homogeneously mixed at room temperature, with vigorous stirring, with 1.6 parts by weight of the compound of formula

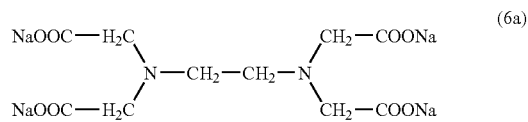

(6a)

and 382.4 parts by weight of water, and then ground in a Fryma mill.

Using a NIRO pilot plant scale atomizer having a binary nozzle, the homogeneous suspension is then spray-dried at an inlet temperature of 150° C., an outlet temperature of from 105 to 110° C. and a water vaporization capacity of 1 kg/h.

Low-dust, free-flowing microgranules having an average particle size of from 5 to 15 μm and a residual water content of about 2% by weight are obtained.

EXAMPLE 2

In an apparatus equipped with a stirrer, 200.0 parts by weight of an aqueous colorant filter cake containing 97.5 parts by weight of the metal complex pigment of formula (1) are homogeneously mixed at room temperature, with vigorous stirring, with 1.6 parts by weight of the compound of formula

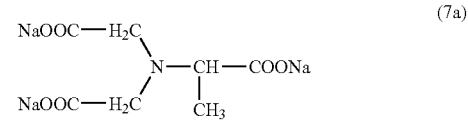

(7a)

and 382.4 parts by weight of water, and then ground in a Fryma mill.

Using a NIRO pilot plant scale atomizer having a binary nozzle, the homogeneous suspension is then spray-dried at an inlet temperature of 150° C., an outlet temperature of from 105 to 110° C. and a water vaporization capacity of 1 kg/h.

Low-dust, free-flowing microgranules having an average particle size of from 5 to 15 μm and a residual water content of about 2% by weight are obtained.

The invention claimed is:

1. A method of producing a low-dust pigment composition, which comprises suspending a filter cake obtained from preparation of a pigment, or a solid pigment, in water, adding thereto from 0.1 to 6.0% by weight, based on the weight of the pigment composition, of an amphoteric surfactant selected from the group consisting of ampholytes, betaines and sulfobetaines that contain in their molecule a radical of formula

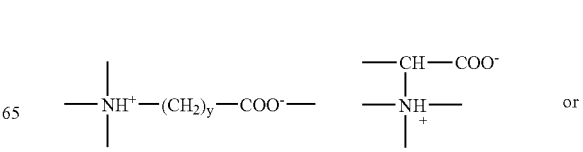

-continued

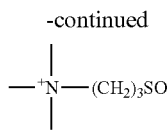

and optionally further adjuvants, and then drying the aqueous suspension to form granules.

2. A method according to claim 1, wherein the pigment is a suspension of an organic metal complex pigment.

3. A method according to claim 2, wherein the organic metal complex pigment is selected from the group consisting of (1)

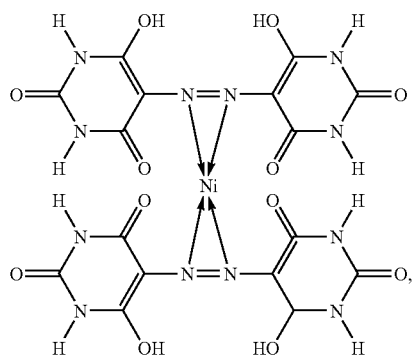

(1a)

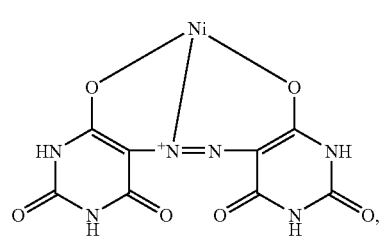

(2)

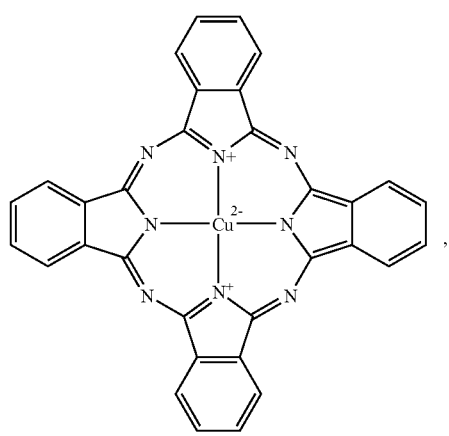

(3)

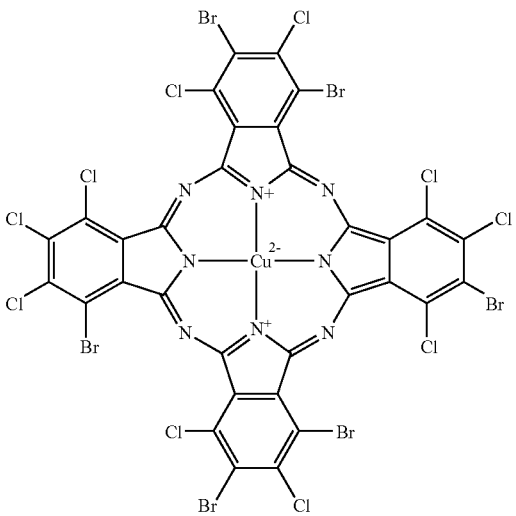

(4)

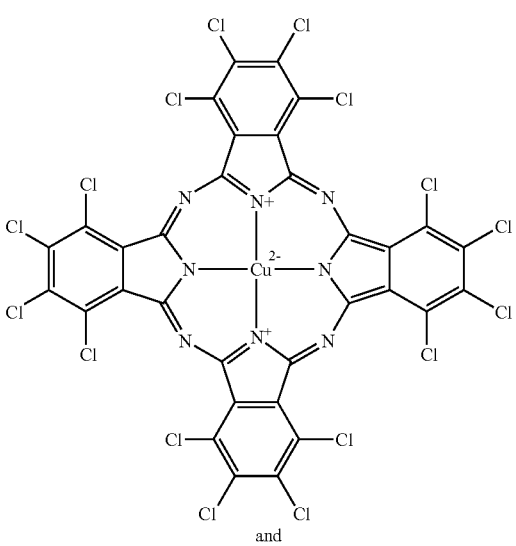

and (5)

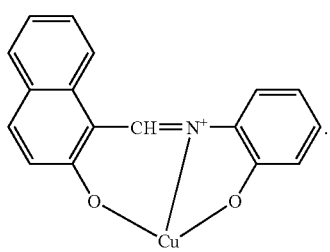

4. A method according to claim 1, wherein the amphoteric surfactant is formula (6)

(6)

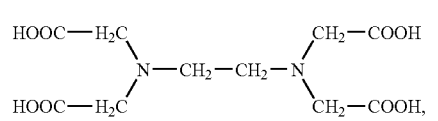

wherein (6) is the free acid form or a salt thereof.

5. A method according to claim 1, wherein the amphoteric surfactant is formula (7)

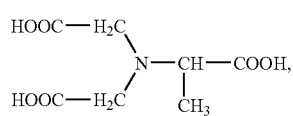 (7)

wherein (7) is the free acid form or a salt thereof.

6. A method according to claim 2, wherein the amphoteric surfactant is formula (6)

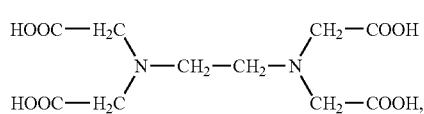 (6)

wherein (6) is the free acid form or a salt thereof.

7. A method according to claim 2, wherein the amphoteric surfactant is formula (7)

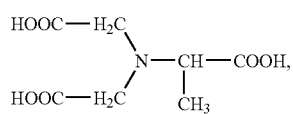 (7)

wherein (7) is the free acid form or a salt thereof.

8. A method according to claim 3, wherein the amphoteric surfactant is formula (6)

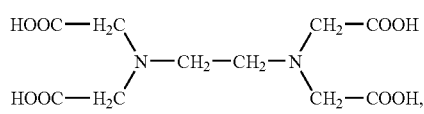 (6)

wherein (6) is the free acid form or a salt thereof.

9. A method according to claim 3, wherein the amphoteric surfactant is formula (7)

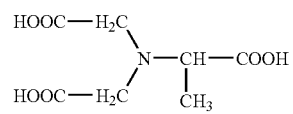 (7)

wherein (7) is the free acid form or a salt thereof.

10. A low-dust pigment composition comprising at least one organic metal complex pigment of the azo, azomethine or phthalocyanine class and from 0.1 to 6.0% by weight, based on the weight of the pigment composition, of an amphoteric surfactant selected from the group consisting of diethylene-triamino-pentaacetic acid, nitrilo-triacetic acid, N-hydroxyethyl-diamino-triacetic acid, 1,3-diamino-2-propanol-tetraacetic acid, in free acid form or in the form of their sodium salts, a compound of formula $(CH_3)_3N^+CH_2COO^-$, a compound of formula $(NaOOC\text{—}CH_3)_2N[(CHCH_3)COONa]$, a compound of formula

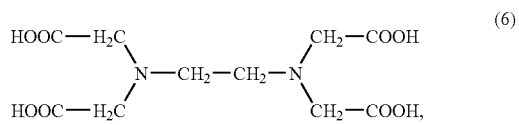 (6)

which is used in free acid form or in the form of a salt and a compound of formula

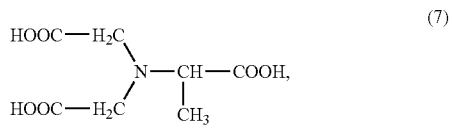 (7)

which is used in free acid form or in the form of a salt.

11. A method of producing colored plastics or colored polymeric particles, which comprises admixing a pigment composition according to claim 10 with said plastics or polymeric particles.

12. A composition according to claim 6 comprising a metal complex pigment of formula (1)

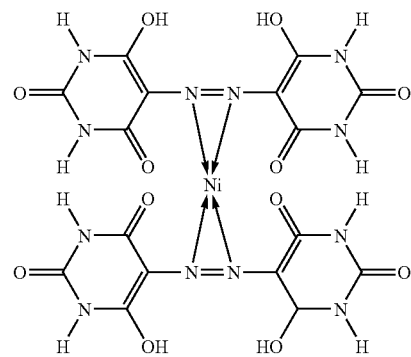

and from 0.1 to 6.0% by weight, based on the pigment composition, of an amphoteric surfactant of formula (7).

* * * * *

UNITED STATES PATENT AND TRADEMARK OFFICE
CERTIFICATE OF CORRECTION

PATENT NO. : 7,033,429 B2
APPLICATION NO. : 10/493278
DATED : April 25, 2006
INVENTOR(S) : Paul Balliello Page 1 of 1

It is certified that error appears in the above-identified patent and that said Letters Patent is hereby corrected as shown below:

<u>On title page,</u> Item (87) should read:

-- (87)  PCT Pub. No.: WO03/037991
         PCT Pub. Date: May 8, 2003 --.

Signed and Sealed this

Eighth Day of August, 2006

JON W. DUDAS
*Director of the United States Patent and Trademark Office*